UNITED STATES PATENT OFFICE.

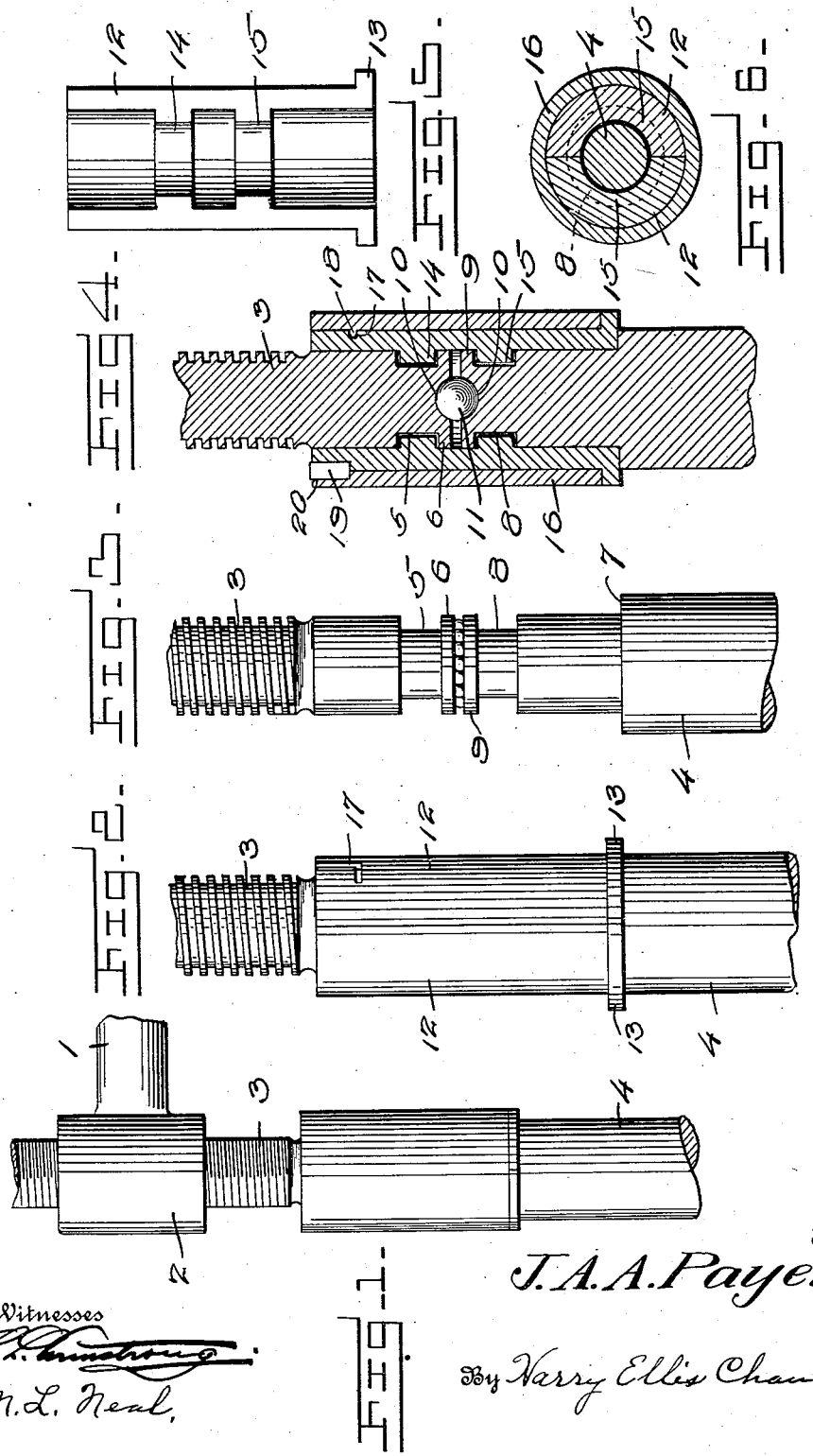

JOHN A. A. PAYEN, OF SCIO, OREGON.

SHAFT-COUPLING.

1,015,906.  Specification of Letters Patent.  Patented Jan. 30, 1912.

Application filed February 15, 1911. Serial No. 608,771.

*To all whom it may concern:*

Be it known that I, JOHN A. A. PAYEN, a citizen of the United States, residing at Scio, in the county of Linn and State of Oregon, have invented certain new and useful Improvements in Shaft-Couplings, of which the following is a specification.

My invention relates to improvements in shaft couplings and has particular reference to improved mechanism for so uniting the ends of the shafts as to permit of their rotation in opposite directions or of their rotation in the same direction at different speeds and which will reduce to a minimum the friction between said ends of the shafts when they are pressed toward each other.

Other objects and advantages of my invention will be apparent from the following description taken in connection with the drawings, and it will be understood that I may make any changes or modifications in the construction within the scope of the claim without exceeding the spirit of the invention.

Figure 1 represents a fragmentary side elevation of a drill equipped with my improvements. Fig. 2 represents an enlarged side elevation with the securing collar removed. Fig. 3 represents a side elevation of a slightly modified construction with the joining sleeves removed. Fig. 4 represents a view of one of the half sleeves. Fig. 5 represents a longitudinal sectional view of the coupling, and Fig. 6 represents a cross sectional view thereof.

In the drawings, the numeral 1 designates the drill frame having the threaded socket 2 through which passes the threaded adjusting spindle 3 for regulating the position of the drill 4.

My invention is shown as applied to connect the adjusting spindle and drill rod in such manner that the drill rod may be rotated at a high rate of speed while the adjusting spindle is rotated slowly. To attain this object, I form in the lower end of the adjusting spindle the groove 5 providing therebelow the flange 6 at the lower end of the spindle, while I preferably reduce the size of the upper end of the rod to correspond in size to the end of the spindle thus providing the shoulder 7 on the rod 4, while formed in its upper end is the groove 8 providing the end flange 9.

Formed in the adjacent faces of the ends of the spindle and drill rod are the recesses 10 in which are mounted the ball or balls 11, in the preferred form of my invention a singly centrally disposed ball being employed although I have illustrated in Fig. 4 a plurality of balls mounted in a race formed near the edge of the rod and spindle, which balls may be employed either in lieu of or supplemental to the central ball.

To retain the ends of the adjusting spindle 3 and the drill rod 4 in correct alined position, I employ the pair of half sleeves 12, said sleeves having the basal flanges 13 adapted to rest upon the shoulder 7 of the drill rod and having the interior ribs 14 and 15 adapted to be engaged in the grooves 5 and 8 respectively. To secure said sleeves upon the rods and spindle, I employ the complete locking sleeve or collar 16 which is adapted to be forced down to tightly fit over the half sleeves and lock them together, while to prevent said collar from working off, I form in each of the half sleeves the L-shaped recess 17 adapted to receive one of the inwardly extending lugs 18 formed on the sleeve, the lug being forced down in one arm of the recess or slot 17 and then the sleeve or collar 16 is twisted to move the lug into the other arm of the slot 17, a key 19 being forced into the key way 20 of the half sleeve and collar to prevent accidental unlocking rotative movement of the collar.

From the foregoing description taken in connection with the drawings the construction and operation of my improved shaft coupling device will be readily understood, and it will be seen that pressure occasioned by the turning of the adjusting spindle will be transmitted to the drill rod through the ball or balls 10 and that the friction between said parts will be reduced to a minimum, and it will further be seen that the bore of the sleeves and the difference in thickness between the groves 5 and 8 and the ribs 14 and 15 fitting therein is sufficient to prevent binding between said parts and therefore to eliminate this friction. It will further be observed that I have provided improved means for securing the half sleeves in position and for preventing the accidental slipping or creeping off of the retaining collar, while the flange 13 of the sleeve being interposed between said locking collar and the shoulder 7 of the rotating drill rod prevents the shoulder from engaging the collar to twist it loose.

I claim:

In a shaft coupling the combination with a rod having a groove formed peripherally therein, of a second rod having a reduced portion providing a shoulder, said latter rod likewise having a groove formed therein, anti-friction means between said rods, a pair of half sleeves each having a flange to rest upon the shoulder of the one rod and having a pair of inwardly projecting ribs formed thereon, said ribs being adapted to fit in the grooves of the two rods and being of slightly less width than said groove, said half sleeves having L-shaped slots formed in their outer face, a collar fitting around the sleeves to lock them together, and inwardly projecting lugs formed on the collar and engaged in the slots, and means for locking the collar and sleeves against relative rotation.

In testimony whereof I affix my signature, in the presence of two witnesses.

JOHN A. A. PAYEN.

Witnesses:
J. A. BILYEN,
A. D. ELDER.

Copies of this patent may be obtained for five cents each, by addressing the "Commissioner of Patents, Washington, D. C."